United States Patent
Dunstan

(10) Patent No.: US 10,067,545 B2
(45) Date of Patent: Sep. 4, 2018

(54) UNIVERSAL SERIAL BUS ACTIVE CABLE POWER MANAGEMENT

(71) Applicant: Intel Corporation, Santa Clara, CA (US)

(72) Inventor: Robert A. Dunstan, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 943 days.

(21) Appl. No.: 14/499,014

(22) Filed: Sep. 26, 2014

(65) Prior Publication Data

US 2015/0212497 A1 Jul. 30, 2015

Related U.S. Application Data

(60) Provisional application No. 61/933,163, filed on Jan. 29, 2014.

(51) Int. Cl.
*G06F 1/26* (2006.01)
*G06F 13/40* (2006.01)

(52) U.S. Cl.
CPC ............ *G06F 1/26* (2013.01); *G06F 13/4068* (2013.01); *Y10T 307/858* (2015.04)

(58) Field of Classification Search
CPC ............... G05B 11/01; H01R 13/6466; H01R 13/6469; H01R 13/665; H01R 13/6658
See application file for complete search history.

(56) References Cited

U.S. PATENT DOCUMENTS

| | | | |
|---|---|---|---|
| 5,821,736 A | 10/1998 | Yeon | |
| 2010/0095139 A1 | 4/2010 | Murphy et al. | |
| 2012/0011286 A1* | 1/2012 | Wong | H04B 10/40 |
| | | | 710/14 |
| 2013/0217274 A1* | 8/2013 | Bar-Niv | H01R 27/02 |
| | | | 439/676 |

FOREIGN PATENT DOCUMENTS

| | | |
|---|---|---|
| CN | 102315576 A | 1/2012 |
| CN | 102822812 A | 12/2012 |
| KR | 20130031841 A | 3/2013 |
| TW | M252058 U | 12/2004 |
| TW | I301343 B | 9/2008 |
| TW | M458687 U | 8/2013 |
| WO | 2012003385 A1 | 1/2012 |

OTHER PUBLICATIONS

CN Search Report, CN Application No. 201410831856.3, dated May 3, 2017, 1 page.
Taiwan IPO Search Report, Application No. 103144780, completed Dec. 28, 2015, 2 pages.

* cited by examiner

*Primary Examiner* — Jeffrey Shin
(74) *Attorney, Agent, or Firm* — International IP Law Group, P.L.L.C.

(57) ABSTRACT

The present disclosure provides a system and method for controlling power in an active cable via a circuit mechanism located internally within the cable assembly. The system may include a first device communicatively coupled to a second device via the cable assembly and a device power line. The circuit mechanism may control power to the cable assembly and a voltage comparator may be connected to the circuit mechanism to regulate the flow of power associated with the cable of the cable assembly.

25 Claims, 4 Drawing Sheets

300

400

UNIVERSAL SERIAL BUS ACTIVE CABLE POWER MANAGEMENT

PRIORITY CLAIM

This application claims the benefit of the filing date of U.S. Provisional Application 61/933,163, filed on Jan. 29, 2014.

TECHNICAL FIELD

This disclosure relates generally to active cables and circuit mechanisms. More specifically, the disclosure describes a circuit mechanism within an active cable, where the circuit mechanism is to control current consumed by the active cable.

BACKGROUND

Some cables include integrated electronic components. These cables may be referred to as "active cables." The integrated electronic components may perform operations on a data signal carried across the active cable, where the data signal may be fed to a device connected to the active cable. In order for the integrated electronic components to function properly, power is supplied to the integrated electronic components of the active cables. However, standards associated with active cables such as USB, Thunderbolt, Firewire, DP, HDMI, etc., may not include an allowance for power for the active cable.

BRIEF DESCRIPTION OF DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

A Universal Serial Bus (USB) Type-C Connector includes a pin intended to power active cables. However, the USB power distribution infrastructure does not allow for power to the active cables. In other words, power distribution according to the USB standards does not enable power for active cables. Moreover, many small devices such as mobile phones and tablets simply cannot power an active cable. The problem is even more acute when the battery of a small device is low. Thus, an active cable should control the current consumed by the active cable.

The present disclosure generally relates to a cable assembly embodying a circuit mechanism to control the current consumed by the active cable. The cable assembly may include integrated electronic components, which are powered by the circuit mechanism. The cable assembly may control the current consumed by the active cable to a plurality of levels. In embodiments, the current in the active cable may be one of two levels. The circuit mechanism may include a voltage comparator that controls logic to select a maximum amount of power that is consumed by the active cable. In some embodiments, the cable assembly may be connected to a first device and a second device to provide data signals between the devices via the integrated electronic components. Power consumed by the active cable is controlled without an independent communications path to each end of the cable and/or additional wires in the cable. Moreover, the present techniques can take explicit advantage of a defined USB Type-C connector and the power sources of the active cable when attached to a USB Type-C connector. Further, in embodiments, USB devices and active cables can obtain power without complicated messaging exchanges.

Figure 1:
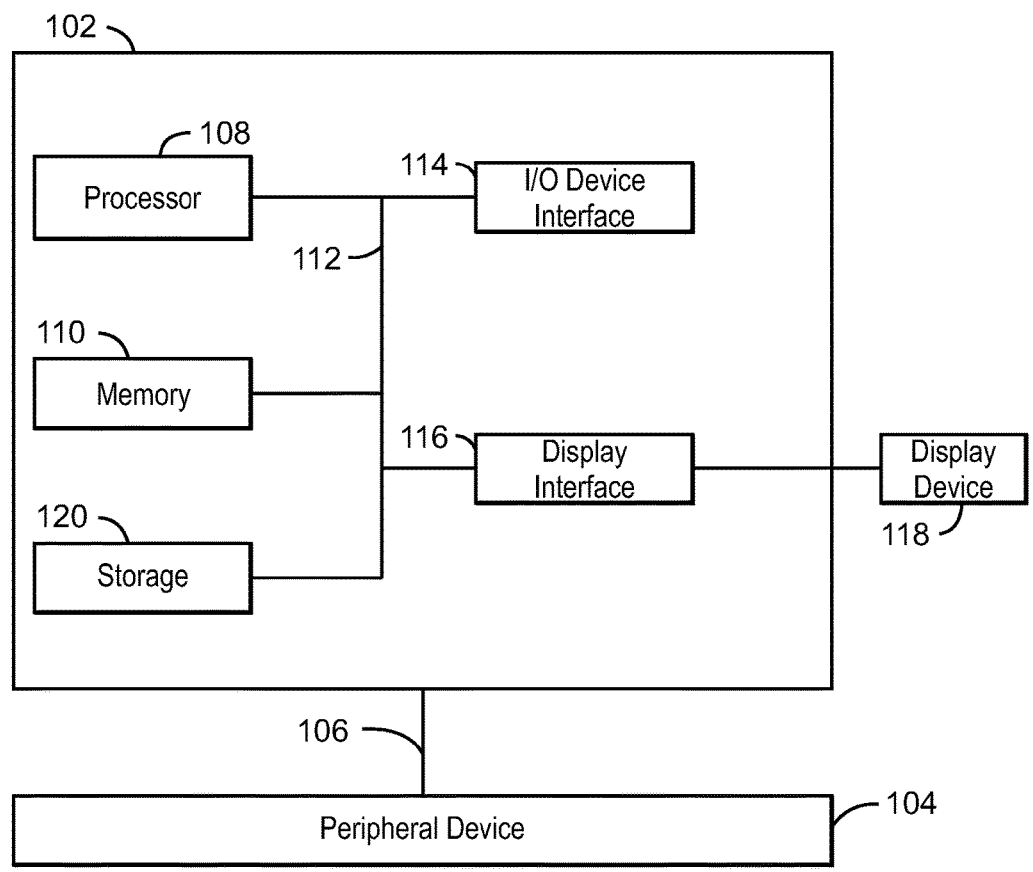
FIG. 1 is a block diagram of system including a first device connected to a second device via a cable assembly.

FIG. 1 is a block diagram of system 100 including a first device 102 connected to a second device 104 via a cable assembly 106. The cable assembly 106 may include electronic components (not shown) integrated within the cable assembly 106. The cable assembly 106 may be an active cable according to a number of standards, including, but not limited to USB, Thunderbolt, Firewire, DisplayPort (DP), High-Definition Multimedia Interface (HDMI). Moreover, the first device 102 and the second device 104 may include connectors according to any standard, including but not limited to USB, Thunderbolt, Firewire, DP, and HDMI. As a result, the present techniques may be applied to cable assemblies that are used to connect devices with connections according to any standard. For example, the cable assembly may be used with a USB to HDMI connection, a USB to DP connection, a USB to Thunderbolt connection, and the like.

For example, the USB standard may be any USB standard, such as the USB 3.1 Specification released on Jul. 26, 2013, including the USB Type-C Cable and Connector Specification Revision 1.0, Aug. 11, 2014. Moreover, the Thunderbolt standard may be according to any Thunderbolt Specification. The Firewire standard may be according to any Firewire Specification, such as an Institute of Electrical and Electronics Engineers (IEEE) P1394d Specification formed by the IEEE on Mar. 9, 2009. Additionally, the DisplayPort standard may be any DisplayPort Standard, such as according to the DisplayPort version 1.3, released on Sep. 15, 2014. The HDMI standard may be according to any HDMI Specification, such as the HDMI Specification Ver.2.0 released Sep. 4, 2013.

The cable assembly 106 may also include a device power line or wire (not shown) integrated within the cable assembly 106 to further facilitate the flow of power from the first device 102 to the second device 104. The cable assembly 106 may also include an internal power line that is configured to provide power to the integrated electronic components of the cable 106. In embodiments, the current consumed by the active cable is at one of two levels, which can be referred to a high level and a low level. In embodiments, a high current level refers to a level of current that enables full functionality of the cable 106, while the low current level refers to a level of current at which minimal logic is functional. The cable assembly 106 is herein further described in greater detail with respect to FIG. 2.

The cable assembly 106 may be configured to provide data signals from the first device 102 to the second device 104. In some cases, the device power line is configured to provide power from the first device 102 to the second device 104. The first device 102 may be a host computing device, for example, a laptop computer, desktop computer, tablet computer, mobile device, server, or cellular phone, among others. The first device 102 may include a main processor 108 that is adapted to execute stored instructions, as well as a memory device 110 that stores instructions that are executable by the main processor 108. The main processor 108 can be a single core processor, a multi-core processor, a computing cluster, or any number of other configurations. The main processor 108 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the main processor 108 includes dual-core processor(s), dual-core mobile processor(s), or the like. The memory device 110 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems.

The main processor 108 may be connected through a system bus 112 (e.g., PCI, ISA, PCI-Express, HyperTransport®, NuBus, etc.) to an input/output (I/O) device interface 114. In some cases, the I/O device interface 114 is adapted to connect the first device 102 to a second device 104 via the cable assembly 106. The second device 104 may be a peripheral device and may include, for example, a keyboard and a pointing device, wherein the pointing device may include a touchpad or a touchscreen, a peripheral device such as a camera, a media player, a printer, among others. Further, the second device may also be a laptop computer, desktop computer, tablet computer, mobile device, server, or cellular phone, among others.

The main processor 108 is linked through the system bus 112 to a display interface 116 adapted to connect the first device 102 to a display device 118. The display device 118 may include a display screen that is a built-in component of the first device 102. The display device 118 may also include a computer monitor, television, or projector, among others, that is externally connected to the first device 102. Moreover, the display device can be integrated into the first device 102. For example, the display device 118 may be a touch-screen.

The first device 102 also includes a storage device 120. The storage device 120 may include a physical memory such as a hard drive, an optical drive, a flash drive, an array of drives, or any combinations thereof. The storage device 120 may also include remote storage drives accessed via a network. Accordingly, the first device 102 may include a network interface card (NIC) that is to enable the first device to access a network, such as a private network or the Internet.

The block diagram of FIG. 1 is not intended to indicate that the first device 100 is to include all of the components shown in FIG. 1. Rather, the first device 100 can include fewer or additional components not illustrated in FIG. 1 (e.g., sensors, power management integrated circuits, additional network interfaces, etc.). The first device 100 may include any number of additional components not shown in FIG. 1, depending on the details of the specific implementation. Furthermore, any of the functionalities of the CPU 108 may be partially, or entirely, implemented in hardware and/or in a processor. For example, the functionality may be implemented with an application specific integrated circuit, in logic implemented in a processor, in logic implemented in a specialized graphics processing unit, or in any other device. Moreover, the second device 104 may include components similar to the first device 102.

Figure 2:
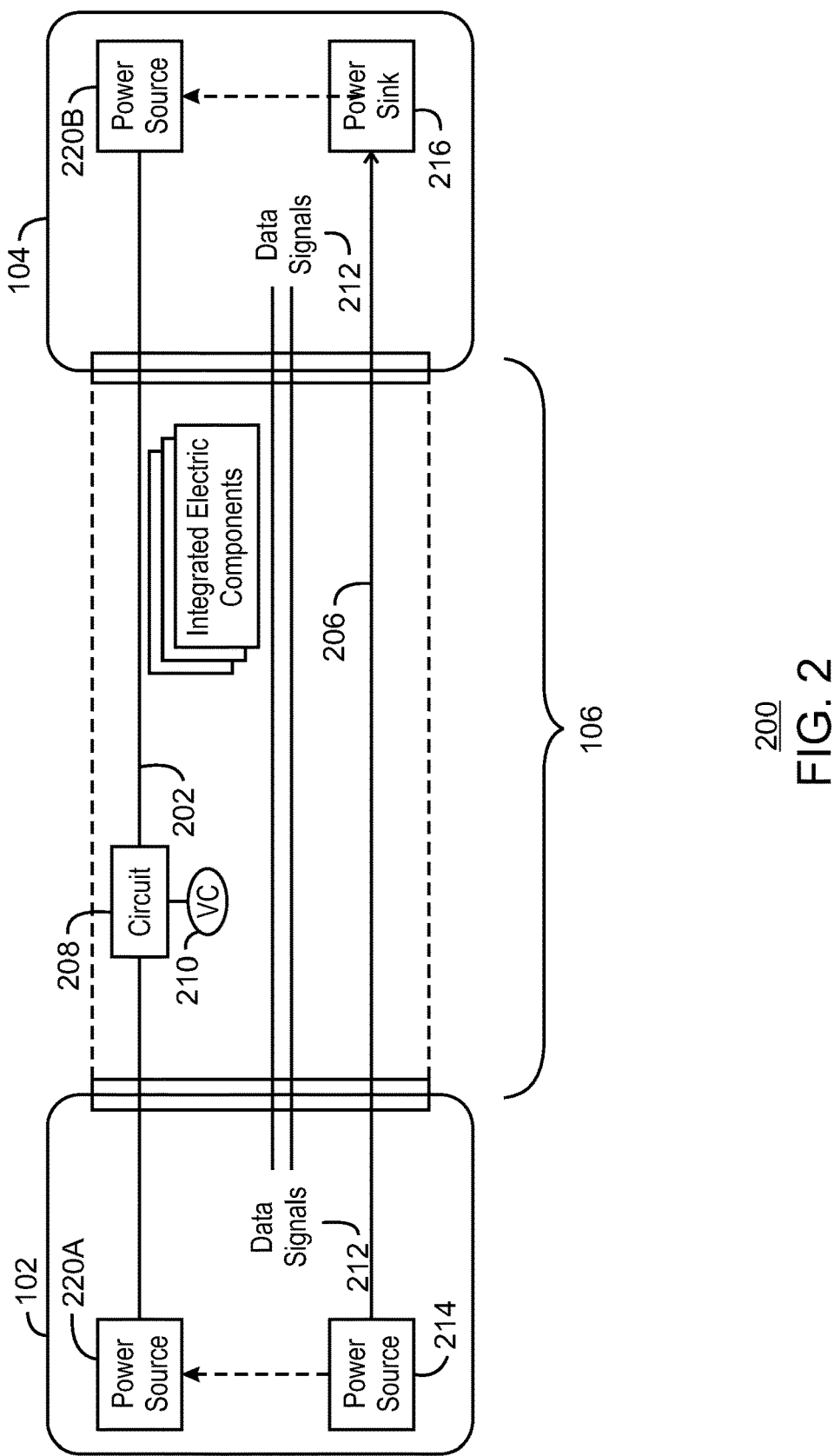
FIG. 2 is a block diagram of a first embodiment of a system including the cable assembly of FIG. 1.

FIG. 2 is a block diagram of a system 200 including the cable assembly 106 of FIG. 1. Like numbers are as described with respect to FIG. 1. The cable assembly 106 includes an internal power line 202, integrated electronic components 204, a device power line 206, a circuit 208, and a voltage comparator 210.

The internal power line 202 may receive its power from a power source 220A or a power source 220B, depending on the configuration of the devices. Each of the first device 102 and the second device 104 may include an isolation mechanism to reduce back-powering the first device 102 from the second device 104, and vice versa.

The circuit 208 may be coupled with the internal power line 202 to control the amount of current or voltage consumed by the internal power line 202 to a particular level. The circuit may control the current or voltage to a plurality of levels. For example, the current level may be a high current level or a low current level. A change the current levels of the active cable directly results in a change of the power level. The high current level results in a higher amount of power available to the active cable when compared to the low power level. The internal power line 202 is to operate at full functionality at the high current level. The low power level results in a lower amount of power available to the active cable when compared to the high power level. Thus, the active cable is to operate such that a minimum amount of power is consumed. Accordingly, at a low current level, the active cable may operate at a minimal functionality. For example, only interface electronics may be powered at the low current level. In embodiments, the current may be reduced to a usable non-zero current at the low current level. Further, In one or more embodiments, the circuit 208 may be coupled with a connector voltage (Vconn) pin in a Universal Serial Bus (USB) Type-C Connector. This configuration may enable the active cable 106 to operate when the Vconn is greater than the minimum voltage allowed at a device. The minimum voltage may be the minimum power allowed on the Vbus according to the USB standard. For example, the minimum voltage allowed on Vbus may be 4 volts (V). When the voltage falls below 4V, the circuit mechanism controls logic that causes the active cable's current to go to a low safe level. The low safe level may be approximately 20 mA. In some cases, voltage comparator 210 may select the maximum power that the active cable is allowed to consume. In embodiments, the current can be adjusted based on the maximum power selected by the voltage comparator.

Data signals may travel between the first device 102 to the second device 104. The integrated electronic components 204 may include drivers to preserve the integrity of the data signals 212 by, for example, reshaping and retiming the signal. In some cases, the cable assembly 106 may be long enough such that the data signals 212 may become degraded, and may therefore lose data signal integrity. In embodiments, the integrated electronic components 204 may perform operations on the data signals 212. The operations may include any combination of buffering the data signals 212, reshaping the data signals 212, retiming the data signals 212, and the like. For example, the power provided by the circuit 208 may provide power to the drivers in the integrated electronic components 204 to reshape and retime the data signals 212 before the data signals 212 can be sent to the first device 102 and the second device 104.

In one or more embodiments, the integrated electronic components 204 may include conversion electronics to convert the data signals 212 from one format into another format. For example, an optical signal may travel longer distances than an electrical signal. The integrated electronic components 204 may include an optoelectronic device configured to convert the data signals 212 from an electronic data signal to an optical data signal.

In one or more embodiments, the cable assembly 106 may include a hysteresis value associated with the circuit 208 and a timer (e.g. ~1 second) associated with the circuit 208. The hysteresis value may include a sufficient value (e.g., 0.5 V). The circuit mechanism may also include a retry count limit that may prevent the circuit mechanism from oscillating. The mechanism and associated logic can be integrated into the active electronics of the cable assembly 106.

Figure 3:
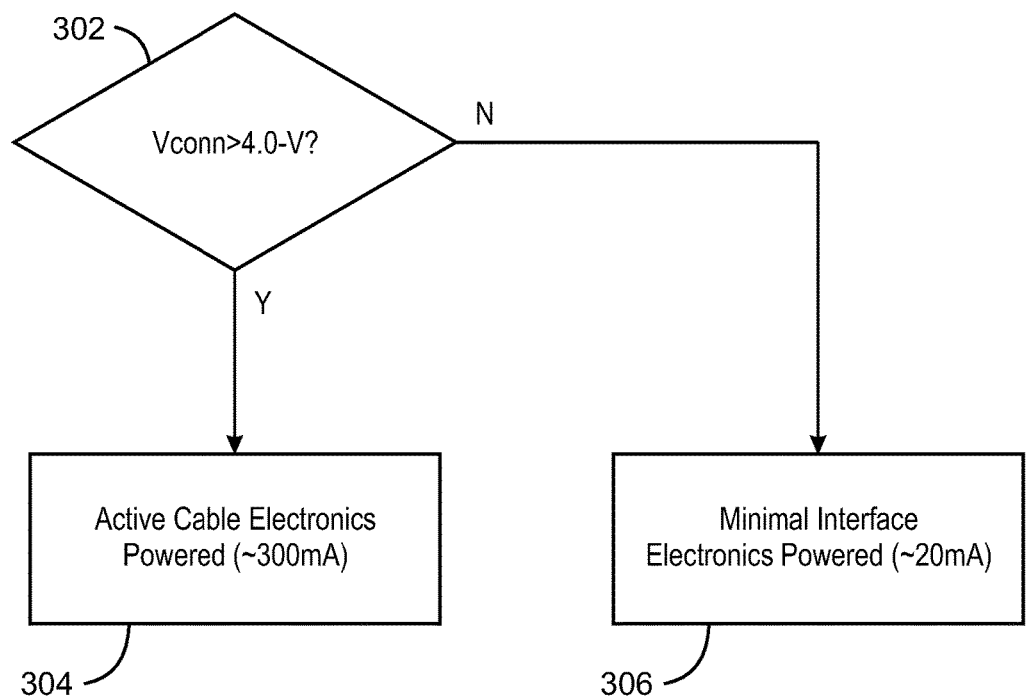
FIG. 3 is a block diagram of a second embodiment of a system including the cable assembly of FIG. 1.

FIG. 3 is a process flow diagram of a method for a circuit mechanism within an active cable. As previously discussed, an active cable may include a circuit mechanism that is to internally supply power to the active cable. In one or more embodiments, the circuit mechanism may be attached to a Vconn pin of a USB Type-C connector to allow the active cable to operate at a minimum power, e.g., Vbus, allowed by a device connected to the active cable. At block 302, it is determined if the Vconn is greater than the minimum power, e.g., 4V. If the Vconn is greater than 4V, at block 304, the active cable electronics may be powered on with a high level of current. In examples, the high level of current is about 300 mA. If the Vconn is not greater than 4V, at block 306, the active cable is to operate at a low current level, such that minimal interface electronics are powered. The low current level may be, for example, 20 mA.

Figure 4:
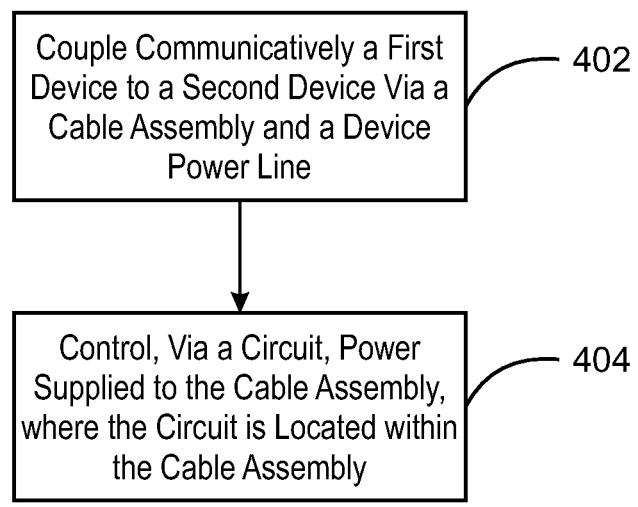
FIG. 4 is a block diagram of a schematic for a circuit mechanism within an active cable.

FIG. 4 is a block diagram of a method to supply power via circuit mechanism to a cable assembly. Conventional cable assemblies may receive power supply from external sources. However, it may be advantageous for the cable assembly to control current consumed by an active cable. At block 402, a first device may be communicatively coupled to a second device via a cable assembly and a device power line. At block 404, the cable assembly may control current consumed by an active cable via a circuit mechanism, where the circuit mechanism is internally located within the cable assembly. A device power line may supply power between the first and second devices. Thus, the supply of power provided to the cable assembly and the supply of power provided to the devices may embody separate power sources.

Example 1

A cable assembly is described herein. The cable assembly in comprises a cable. Electronic components are integrated within the cable. A circuit located within the cable, wherein the circuit controls current consumed by the cable.

The circuit may be coupled with a connector voltage (VConn) pin of a Universal Serial Bus (USB) Type C connector. The circuit may control the level of power supplied to the cable to a high level or a low level. The circuit may include a voltage comparator that is to control logic to select a maximum power that the cable is to consume. The high level of power may enable the cable to provide full functionality. The low level of power may enable power to a minimum electronic interface of the cable. The cable may be an active cable. The current consumed by the cable may be a high level of current at 300 milliAmperes. The current consumed by the cable may be a low level of current at 20 milliAmperes. The cable may transmit a data signal between a first device and a second device, and wherein the electronic components perform operations on the data signal. The circuit may control the level of power supplied to the cable by providing either a maximum power level or a minimal power level. The circuit may enable the cable to operate at a connector voltage greater than 4 volts (V). The circuit may enable the cable to operate in at safe level when a connector voltage is less than 4 volts (V). A voltage comparator may control logic at which the cable is allowed to consume a maximum power. The circuit may include a timer.

Example 2

A system is described herein. The system comprises a first device communicatively coupled to a second device via a cable assembly, wherein data signals are to be transmitted between the first device and the second device. The system also comprises a circuit, wherein the circuit is a component of the cable assembly and the circuit is to control current within the cable assembly at a high level or at a low level.

The circuit may be coupled with a connector voltage (VConn) pin of a Universal Serial Bus (USB) Type C connector. A voltage comparator is coupled with the circuit, and the voltage comparator is to control logic to select a maximum power that the cable is to consume. The current in the cable assembly may be controlled without any additional wires. The voltage comparator may be coupled with a connector voltage (Vconn) pin of a USB (Universal Serial Bus) Type-C connector. The cable assembly may provide a data signal between the first device and the second device. The first device may include a power source to provide power to the second device via the device power line. The cable may include integrated electric components that are to preserve the integrity of the data signals. The cable may include integrated electric components that are to buffer the data signals. The power provided to the cable assembly may be independent of power provided to the device power line.

Example 3

A method is described herein. The method comprises coupling a first device to a second device via a cable assembly, wherein the cable assembly comprises a device power line. The method also comprises controlling, via a circuit, current consumed by the cable assembly, wherein the circuit is located within the cable assembly.

The maximum amount of power that the cable assembly is allowed to consume via may be controlled a voltage comparator. Logic of the circuit may be controlled when an allowable minimal amount of power of the cable is reached. The circuit may be attached to a connector voltage (VConn) pin. Power may be provided to the second device via the device power line, wherein the device power line is coupled to a power source of the first device and is isolated from the cable assembly. A retry count limit may to prevent the circuit from oscillating.

Example 4

An apparatus is described herein. The apparatus comprises a cable, wherein electronic components are integrated within the cable. The apparatus also comprises a means to control current consumed by the cable.

The means to control current may be coupled with a connector voltage (VConn) pin of a Universal Serial Bus (USB) Type C connector. The means to control current may control the level of power supplied to the cable to a high level or a low level. Additionally, the means to control current may includes a voltage comparator that is to control logic to select a maximum power that the cable is to consume. The high level of power may enable the cable to provide full functionality. The low level of power may enable power to a minimum electronic interface of the cable. The cable may be an active cable. The current consumed by the cable may be a high level of current at 300 milliAmperes. The current consumed by the cable may be a low level of current at 20 milliAmperes. The cable may transmit a data signal between a first device and a second device, and wherein the electronic components perform operations on the data signal. The means to control current may control the level of power supplied to the cable by providing either a maximum power level or a minimal power level. Additionally, the means to control current may enable the cable to operate at a connector voltage greater than 4 volts (V). The means to control current may enable the cable to operate in at safe level when a connector voltage is less than 4 volts (V). A voltage comparator may controls logic at which the cable may consume a maximum power. The means to control current may include a timer.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A cable assembly, comprising:
   a cable, wherein electronic components are integrated within the cable; and
   a circuit located within the cable, wherein the circuit is to control current that is to be consumed by the cable and wherein the current consumed by the cable is used by the electronic components to retime data signals.

2. The cable assembly of claim 1, wherein the circuit is coupled with a connector voltage (VConn) pin of a Universal Serial Bus (USB) Type C connector.

3. The cable assembly of claim 1, wherein the circuit is to control the level of power supplied to the cable to a high level or a low level.

4. The cable assembly of claim 1, wherein the circuit includes a voltage comparator that is to control logic to select a maximum power that the cable is to consume.

5. The cable assembly of claim 1, wherein a high level of power enables the cable to provide full functionality.

6. The cable assembly of claim 1, wherein a low level of power enables power to a minimum electronic interface of the cable.

7. The cable assembly of claim 1, wherein the cable is an active cable.

8. The cable assembly of claim 1, wherein the current consumed by the cable is a high level of current at 300 milliAmperes.

9. The cable assembly of claim 1, wherein the current consumed by the cable is a low level of current at 20 milliAmperes.

10. The cable assembly of claim 1, wherein the cable is to transmit the data signals between a first device and a second device, and wherein the electronic components are to reshape the data signals.

11. The cable assembly of claim 1, wherein the circuit is to control the level of power supplied to the cable by providing either a maximum power level or a minimal power level.

12. The cable assembly of claim 1, wherein the circuit is to enable the cable to operate at a connector voltage greater than 4 volts (V).

13. A system, comprising:
    a first device communicatively coupled to a second device via a cable assembly, wherein data signals are to be transmitted between the first device and the second device and the cable assembly comprises a device power line;
    a circuit, wherein the circuit is a component of the cable assembly and the circuit is to control current within the cable assembly at a high level or at a low level, wherein a power supply to the cable supply is separate from a power supply to the first device and the second device via the device power line.

14. The system of claim 13, wherein the circuit is coupled with a connector voltage (VConn) pin of a Universal Serial Bus (USB) Type C connector.

15. The system of claim 13, wherein a voltage comparator is coupled with the circuit, and the voltage comparator is to control logic to select a maximum power that the cable is to consume.

16. The system of claim 13, wherein the current in the cable assembly is controlled without any additional wires.

17. The system of claim 13, wherein a voltage comparator is coupled with a connector voltage (Vconn) pin of a USB (Universal Serial Bus) Type-C connector.

18. The system of claim 13, wherein the cable assembly provides a data signal between the first device and the second device.

19. The system of claim 13, wherein the first device includes a power source to provide power to the second device via the device power line.

20. The system of claim 13, wherein the cable includes integrated electric components that are to preserve the integrity of the data signals.

21. A method, comprising
coupling a first device to a second device via a cable assembly, wherein the cable assembly comprises a device power line isolated from a power supply of the cable assembly; and
controlling, via a circuit, current consumed by the cable assembly, wherein the circuit is located within the cable assembly.

22. The method of claim 21, comprising controlling the maximum amount of power that the cable assembly is allowed to consume via a voltage comparator.

23. The method of claim 21, comprising controlling logic of the circuit when an allowable minimal amount of power of the cable is reached.

24. The method of claim 21, comprising attaching the circuit to a connector voltage (VConn) pin.

25. The method of claim 21, comprising providing power to the second device via the device power line, wherein the device power line is coupled to a power source of the first device.

* * * * *